United States Patent [19]

Budzich

[11] 4,037,621

[45] July 26, 1977

[54] LOAD RESPONSIVE CONTROL VALVE WITH CONSTANT LEAKAGE DEVICE

[76] Inventor: Tadeusz Budzich, 80 Murwood Drive, Moreland Hills, Ohio 44022

[21] Appl. No.: 635,416

[22] Filed: Nov. 26, 1975

[51] Int. Cl.[2] ...................... F15B 13/042; F16K 11/00

[52] U.S. Cl. ................................ 137/596.13; 91/451; 137/513.5

[58] Field of Search ..................... 91/451; 137/596.13, 137/513.5; 138/46

[56] References Cited

U.S. PATENT DOCUMENTS

| | | | |
|---|---|---|---|
| 676,271 | 6/1901 | Ofeldt | 137/513.5 X |
| 780,986 | 1/1905 | Francis | 138/46 X |
| 2,056,249 | 10/1936 | Bystricky | 137/513.5 X |
| 2,624,321 | 1/1953 | Levetus | 91/451 |
| 3,181,561 | 5/1965 | Schaller | 137/513.5 X |
| 3,197,960 | 8/1965 | Forster | 91/451 X |
| 3,488,953 | 1/1970 | Haussler | 137/596.13 X |
| 3,841,096 | 10/1974 | Koppen et al. | 137/596.13 X |
| 3,878,864 | 4/1975 | Schurger | 137/596.13 |
| 3,882,896 | 5/1975 | Budzich | 137/596.1 |

*Primary Examiner*—Irwin C. Cohen
*Attorney, Agent, or Firm*—William N. Hogg

[57] ABSTRACT

A pressure compensated load responsive flow control valve for use in a system controlling a plurality of loads. The system is powered by a single, fixed displacement pump. The flow control valve is equipped with a load responsive control, which during simultaneous control of multiple loads automatically maintains the pump discharge pressure at a level higher than the pressure required by the largest load being controlled. To obtain unidirectional flow, load sensing passages of individual valve spools are connected by check valves with the load responsive control, which is equipped with a leakage control, maintaining a relatively constant leakage from load sensing circuit, irrespective of sensing circuit pressure and permitting fast response of pressure compensated load responsive flow control valve without excessive leakage losses.

5 Claims, 3 Drawing Figures

LOAD RESPONSIVE CONTROL VALVE WITH CONSTANT LEAKAGE DEVICE

BACKGROUND OF THE INVENTION

This invention relates generally to pressure compensated load responsive flow control valves of direction control type, which in control of a load, while using a control load pressure sensing passage, automatically maintain pump discharge pressure at a level higher, by a constant pressure differential, than the pressure required by the controlled load, by bypassing excess pump flow to system reservoir. Such a control valve disclosed in U.S. Pat. No. 3,488,953 dated Jan. 13, 1970, although effective in control of a single positive load at a time, cannot simultaneously control multiple positive loads.

This disadvantage is overcome by control valve disclosed in my U.S. Pat. No. 3,822,896 and my pending patent application Ser. No. 522,324 filed Nov. 8, 1974, entitled "Load Responsive Fluid Control Valves", in which individual check valves, in load pressure sensing passages, permit phasing pressure signals of only the highest system load to the differential bypass control of the flow control valve, while isolating pressure signals from other loads. Those valves, although effective in control of multiple positive loads, suffer from a number of disadvantages. Because of the large cross sectional area of the differential bypass valve and its long control stroke, a comparatively large volume of fluid is required to operate it. Therefore small diameter and length of load pressure sensing passages, through which the fluid needed for displacement of the differential bypass valve must pass, limit the response of the valve control and tend to attenuate the control signal.

The response of the differential bypass valve is also adversely affected by another factor. Since the displacement of fluid, caused by the movement of the differential bypass valve in one direction tends to close the check valves in control of load sensing passages, isolating the control space filled with fluid, a constant path of leakage must be provided between the load sensing signal circuit and the system reservoir. This control leakage is usually obtained by providing an orifice between load sensing circuit and system reservoir. Since flow through the orifice is proportional to the square root of pressure differential acting across it, and since flow through the orifice determines response of the differential bypass valve in one direction, an acceptable response of control at low system pressure results in high leakage losses through the control orifice at high system pressure. This not only adversely affects the efficiency of the control valve, but also, since all of the increased leakage flow must be supplied through load pressure sensing passages, further attenuates the control signal.

SUMMARY OF THE INVENTION

It is therefore a principal object of this invention to provide a control of pressure compensated load responsive flow control valve, which provides fast response of differential bypass valve, while limiting maximum control flow from load sensing circuit.

It is another object of this invention to reduce leakage flow from load sensing circuit to a minimum, while retaining fast response of the differential bypass valve.

It is a further object of this invention to provide a pressure compensated load responsive flow control valve with a leakage control which maintains leakage from load sensing circuit at a relatively constant level irrespective of the load sensing circuit pressure and which will not largely attenuate control signal transmitted through the load pressure sensing passages of the load sensing circuit.

Briefly the foregoing and other additional objects and advantages of this invention are accomplished by providing a differential bypass valve of a load responsive flow control valve with a leakage device which provides a relatively constant leakage flow from load sensing circuit, irrespective of load sensing circuit pressure. This feature permits fast uniform response of differential bypass valve throughout the entire pressure range of its operation, without excessive attenuation of control signal and without excessive leakage at high system pressures.

Additional objects of the invention will become apparent when referring to the preferred embodiments of the invention as shown in the accompanying drawings and described in the following detailed description.

DESCRIPTION OF THE PREFERRED EMBODIMENTS

Figure 1:
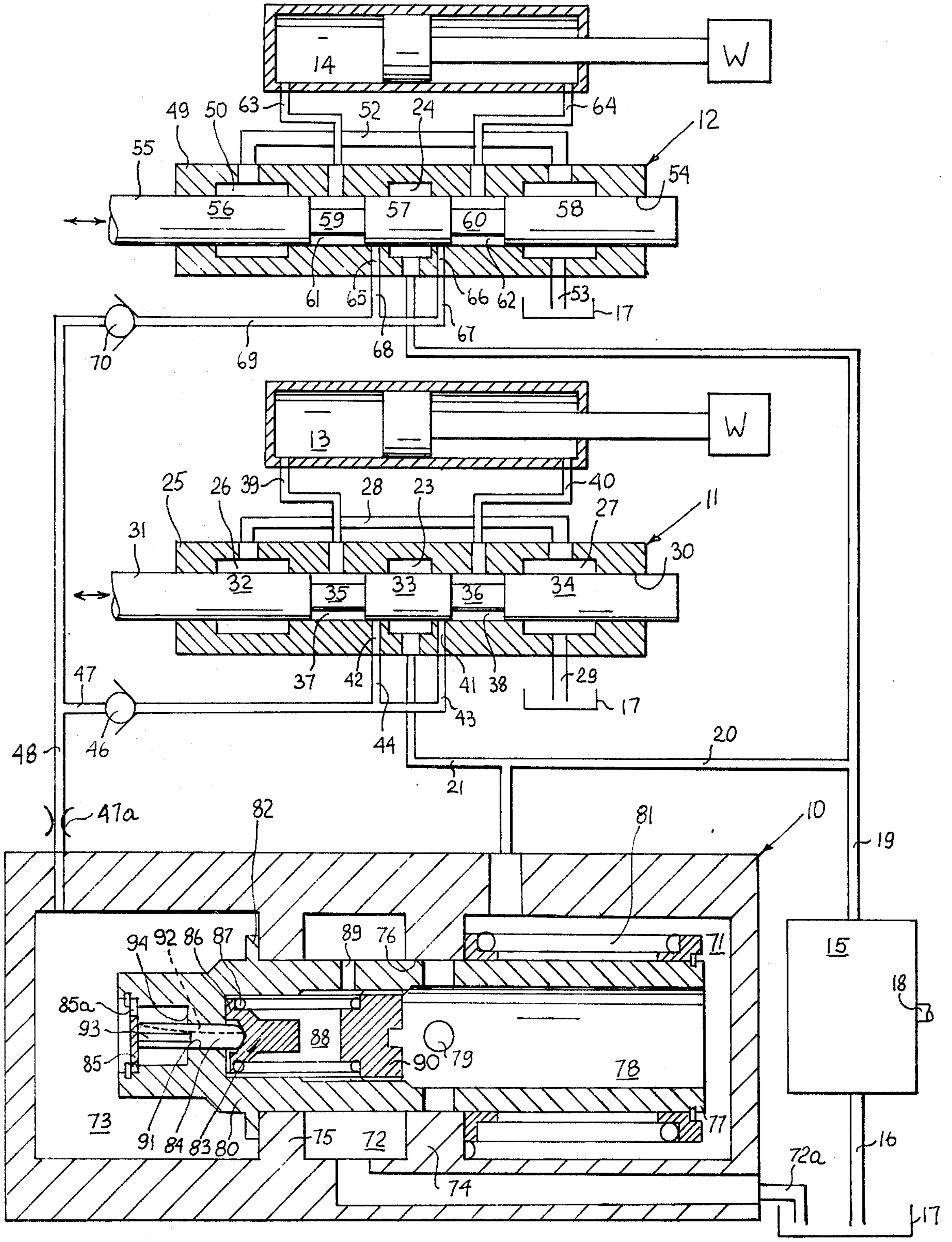
FIG. 1 is a longitudinal sectional view of an embodiment of a differential bypass valve equipped with constant leakage device used in control of flow from schematically shown direction control valve with system lines, pump and reservoir shown diagramatically.

Referring now to the drawings, FIG. 1 shows a section through a differential bypass valve assembly, generally designated as 10, connected into a circuit with direction control valve assemblies, generally designated as 11 and 12 controlling actuators 13 and 14 which drive loads W. Although in FIG. 1, for purposes of demonstration of the principle of the invention, differential bypass valve assembly 10 and direction control valve assemblies 11 and 12 are shown separated, in actual application they would be most likely contained in a single valve housing or would be bolted together as sections of sectional valve assembly.

As shown, fixed displacement pump 15 has an inlet line 16 which supplies fluid to pump from a reservoir 17 and the pump is driven through a shaft 18 by a prime mover not shown. The pump has an outlet line 19 which connects through line 20 to differential bypass valve assembly 10 and through lines 21 and 22 with inlet chambers 23 and 24 of direction control valve assemblies 11 and 12 respectively.

Direction control valve 11 has a valve housing 25 which defines outlet chambers 26 and 27, which are connected to each other by a duct 28 and are further connected by a line 29 to reservoir 17. Valve housing 25 axially guides in a valve bore 30 a valve spool 31 which by lands 32, 33 and 34 and stems 35 and 36 defines load chambers 37 and 38, which are connected through lines 39 and 40 to actuator 13. Load sensing ports 41 and 42 are connected through lines 43, 44 and 45 to a check valve 46 which in turn is connected by lines 47 and 48 to differential bypass valve assembly 10.

Figure 2:
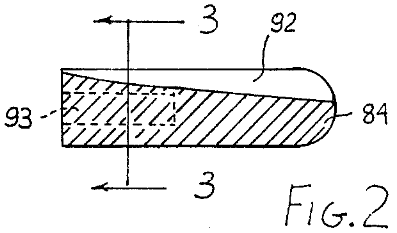
FIG. 2 is an enlarged sectional view of leakage spool of FIG. 1.
Figure 3:
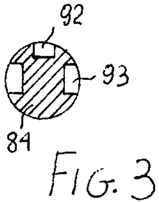
FIG. 3 is a sectional view taken along the plane designated by 3—3 of FIG. 2.

Similarly direction control valve assembly 12 has a valve housing 49 which defines inlet chamber 24 and also defines outlet chambers 50 and 51, which are connected to each other by a duct 52 and further connected by a line 53 to reservoir 17. Valve housing 49 axially guides in a valve bore 54 a valve spool 55 which by lands 56, 57 and 58 and stems 59 and 60 defines load chambers 61 and 62. which are connected through lines 63 and 64 to actuator 14. Load pressure sensing ports 65 and 66 are connected through lines 67, 68 and 69 to a check valve 70, which in turn is connected by line 48 to differential bypass valve assembly 10. The differential bypass valve assembly 10 has a supply chamber 71 communicating with pump 15, an exhaust chamber 72 communicating through a line 72a with reservoir 17 and a control chamber 73, those chambers being separated by partitions 74 and 75. A bore 76 passing through partitions 75 and 74 interconnects supply chamber 71, exhaust chamber 72 and control chamber 73 and axially guides a bypass member 77. Bypass member 77 has an inner bore 78 provided with circumferentially spaced radially extending ports 79 blocked, as shown in position in FIG. 1, by partition 74 and an extension 80 projecting into control chamber 73. Bypass member 77 is biased by a control spring 81, which maintains it in a position where a stop 82 engages partition 75. Extension 80 is equipped with a variable leakage device, generally designated as 83. Variable leakage device 83 has a leakage spool 84, interposed between a stop 85 and a spring guide 86, biased by a spring 87 towards position, as shown in FIG. 1. Stop 85 is provided with openings *85a* which allow free flow of fluid therethough. Spring 87 is positioned in space 88 connected by a drilling 89 with exhaust chamber 72, which in turn is connected by line *72a* with reservoir 17. Preload in spring 87 is adjusted by a threaded member 90. Leakage spool 84, axially guided in a bore 91 in extension 80, is equipped with a variable leakage groove 92, shown in dotted lines in FIG. 1 and in section in FIG. 2 and maximum pressure relief grooves 93. Bore 91 of leakage spool 84 terminates at one end in a control surface 94.

All of the basic system components, as shown in FIG. 1, are at rest in unloaded or unactuated position, with fixed displacement pump 15 not working. With fixed displacement pump 15 not working. With fixed displacement pump 15 started up, the pressure in outlet line 19, line 20 and supply chamber 71 will start to rise, exerting a force, acting on the cross sectional area of bypass member 77 within supply chamber 71. As soon as pressure in supply chamber 71 generates a sufficiently high force on cross sectional area of bypass member 77 to overcome the preload of control spring 81 bypass member 77 will move from right to left, trying to displace fluid from control chamber 73 starting to raise the pressure therein. The resulting rise in pressure in control chamber 73 will first close check valves 46 and 70, isolating control chamber 73 from direction control valve assemblies 11 and 12. Rising pressure in control chamber 73 will induce, in a well known manner, fluid flow through variable leakage groove 92 in leakage spool 84 to space 88, from which fluid flow will be conducted through drilling 89 to exhaust chamber 72, which is connected by line *72a* with reservoir 17, Resulting flow from control chamber 73 will permit movement of bypass member 77 from right to left, the speed of the movement being proportional to fluid flow through variable leakage groove 92 and therefore being a function of pressure in control chamber 73 and cross sectional area of bypass member 77.

The movement of bypass member 77 will gradually connect through port 79 supply chamber 71 with exhaust chamber 72 and therefore with reservoir 17. Under those conditions the fluid supplied by pump 15 to supply chamber 71 will be bypassed to exhaust chamber 72 and condition of equilibrium will be established under which sufficiently high pressure is maintained in supply chamber 71 to keep bypass member 77 displaced against biasing force of control spring 81, to create sufficient flow area through ports 79 to bypass all of the fluid flow supplied by pump 15 to reservoir 17. Therefore under full bypass condition pressure in supply chamber 71 will be equal to the biasing force of control spring 81 divided by the cross sectional area of bypass member 77.

The effective area of fluid flow through variable leakage groove 92 will be established by the relative position of variable leakage groove 92 and therefore leakage spool 84 in respect to control surface 94. In position, as shown in FIG. 1, with leakage spool 84 maintained against stop 85 by spring 87, the effective area of fluid flow through variable leakage groove 92 will be at its maximum value. Preload in spring 87 is so selected that it will balance a force, generated by a certain specific pressure in control chamber 73, acting on cross sectional area of leakage spool 84. Once this pressure level is reached, any further increase in pressure in control chamber 73 will move leakage spool 84 from left to right, changing the relative position of variable leakage groove 92 in respect to control surface 94, changing the effective area of flow through variable leakage groove 92.

The change in effective flow area through variable leakage groove 92, in respect to pressure in control chamber 73, will be determined by the cross sectional area of variable leakage groove 92 along the length of leakage spool and by the preload and rate of spring 87. Since a flow through an orifice is proportional to area of orifice and square root of pressure differential acting across the orifice and since the pressure down stream of orifice is maintained at relatively constant pressure of reservoir 17, leakage flow through variable leakage groove 92, in respect to pressure in control chamber 73, can be regulated in any desired way to obtain optimum performance of load responsive flow control with minimum control signal attenuation at minimum leakage level. The effective flow area of variable leakage groove 92, in respect to movement of leakage spool 84 and rate of spring 87, can be so selected, that a relatively constant leakage flow is maintained from control chamber 73, irrespective of variation in pressure in control chamber 73, providing a control with a uniform response in the direction to increase the bypass flow from supply chamber 77 to exhaust chamber 72, through the entire pressure range of differential bypass valve assembly 10. As is well known in the art the leakage flow from control chamber 73 will not only take place through the variable leakage groove 92, but also through the working clearance between the outer surface of the throttling member 77 and the guiding bore in partition 75. Some additional leakage will take place around sealing surface of leakage spool 84. Since exhaust chamber 72 is maintained at low pressure of the reservoir 17 and since control chamber is normally maintained at much higher pressure, leakage from control chamber 73 through the working clearance to the exhaust chamber 72 can be high and will vary with pressure in control chamber 73. Therefore the relatively constant leakage flow from control chamber 73, as mentioned above, is maintained by selection of effective area of variable leakage groove 92 and rate of spring 87, the actual flow through the variable leakage groove 92 reducing with increase in pressure in control chamber 73, to compensate for other leakages from control chamber 73.

An increase in pressure in control chamber 73 will move bypass member 77 from left to right, gradually reducing the area of bypass flow from supply chamber 71 to exhaust chamber 72 through ports 79. This reduction in area of flow will increase pressure in supply chamber 71 to a point, at which a condition of equilibrium will be established, at which the force generated by pressure in control chamber 73, acting on cross sectional area of bypass member 77 together with biasing force of control spring 81 will be balanced by force generated by pressure in supply chamber 71, acting on cross sectional area of bypass member 77. Therefore differential bypass valve 10 will always regulate bypass flow from supply chamber 71 to exhaust chamber 72, to maintain a constant pressure differential between supply chamber 71 and control chamber 73, equal to the preload in control spring 81 divided by the cross sectional area of bypass member 77.

Assume that during the equilibrium bypass condition of differential bypass valve assembly 10, the valve spool 31 of direction control valve assembly 11 is initially displaced from left to right. Displacement of land 33 connects load chamber 37 with load sensing port 42. Assume also that load chamber 37 is subjected to pressure of positive load W, transmitted from actuator 13 through line 39. Load pressure from load sensing port 42 transmitted through lines 44 and 45, will open check valve 46 and pressurize control chamber 73, while maintaining the check valve 70 closed. The rising pressure in control chamber 73 will disrupt the equilibrium of forces, acting on bypass member 77, moving it from left to right and reducing the area of bypass flow between supply chamber 71 and exhaust chamber 72. In a manner as previously described the equilibrium condition of differential bypass valve 10 will be reestablished, the valve maintaining constant pressure differential between supply chamber 71 and control chamber 73 at a new pressure level in supply chamber 71. Leakage spool 84 will move to its new controlling position, as dictated by pressure level in control chamber 73, maintaining the required fluid flow from control chamber 73.

Assume that valve spool 31 is further displaced from left to right connecting load chamber 37 and load sensing port 42 with inlet chamber 23 while at the same time connecting load chamber 38 with outlet chamber 27. As previously described inlet chamber 23 is maintained by pump 15 at a pressure, higher by a constant pressure differential, than pressure in load chamber 37. Fluid flow will take place from inlet chamber 23 to load chamber 37, this flow being proportional to the area of opening between those two chambers, since a constant pressure differential is maintained between them. Flow into actuator 13, of fluid supplied by the pump 15, will momentarily lower the pump discharge pressure and disturb the equilibrium of differential pressure valve assembly 10. As a result new bypass position of the bypass member 77 will be established and the differential pressure valve assembly 10 will revert to the condition of equilibrium, at which sufficient quantity of fluid from the pump 15 is bypassed to reservoir 17 by the bypass member 77, to maintain, in a manner as previously described, constant pressure differential between load chamber 37 and supply chamber 71. Any sudden reduction in load W, in respect to pressure existing in control chamber 73, will automatically close check valves 70 and 46. Under those conditions bypass member 77 will drift from right to left at a rate at which fluid will flow from control chamber 73 through variable leakage device 83, increasing the bypass flow from supply chamber 71 to exhaust chamber 72 and decreasing pressure in supply chamber 71 and consequently control chamber 73, until check valves 70 and 46 will open connecting pressure signal from highest system load to control chamber 73. Immediately the equilibrium condition of load responsive control will be reestablished, the control maintaining constant pressure differential between supply chamber 71 and load chamber subjected to highest system load.

Therefore response of load responsive control in the direction of reduction of system pressure will be determined by the leakage characteristics of variable leakage device 83. Any sudden rise in load W and corresponding increase in pressure in load chamber 37 and therefore control chamber 73 will automatically reposition, in a manner as previously described, bypass member 77, to increase the pressure in supply chamber 71 and inlet chamber 23, to establish an equilibrium condition at which a constant pressure differential is maintained between inlet chamber 23 and load chamber 37. Under those conditions, in a well known manner, flow supplied from the inlet chamber 23 to actuator 13 will be proportional to displacement of valve spool 31 from the position, at which load chamber 37 and inlet chamber 23 become connected.

Displacement of valve spool 31 from right to left will at first connect load sensing port 41 through lines 43, 45, check valve 46 and line 48 to control chamber 73, further movement of valve spool 31 interconnecting load chamber 38 with inlet chamber 23 and also interconnecting load chamber 37 with outlet chamber 26. The response of the control and the sequence of operations will be the same as those resulting from the displacement of the valve spool 31 in the opposite direction and which has already been described in detail.

Assume that valve spools 31 and 55 are simultaneously displaced from left to right, connecting load sensing ports 42 and 65 with load chambers 37 and 61. Assume also that pressure of positive load exists in both load chambers and that load chamber 61 is subjected to higher pressure than load chamber 37. The higher pressure signal from load chamber 61 will be transmitted through load pressure sensing port 65, lines 68 and 69, check valve 70 and line 48 to control chamber 73. The higher load pressure signal from line 48 will also be transmitted by line 47 to check valve 46, in a well known manner, maintaining it closed and therefore isolating load sensing port 42 from control chamber 73.

The response of the system control to high pressure signal in load control chamber 73 has already been described in detail. However, if resulting pressure in control chamber 73, due to the system load demand will exceed a level, at which maximum pressure relief grooves 93, on leakage spool 87, directly cross connect space 88 with control chamber 73, large increase in leakage from control chamber 73 will saturate lnes 48, 47 and 69 of the load sensing circuit, reducing pressure in control chamber 73 and creating an unbalance of forces acting on bypass member 77, moving it from right to left and reducing the system pressure to the level, equivalent to setting of spring 87 and maximum pressure relief grooves 93, variable leakage device 83 acting as high pressure pilot relief valve. To prevent saturation of lines 48, 47 and 69 of the load sensing circuit and to reduce flow requirement through maximum pressure relief grooves 93 during operation of variable leakage evice 83 as a high pressure pilot relief valve, restriction 47a in line 48 is provided. When variable leakage device 83 maintains system pressure at a constant maximum level, the characteristics of the flow control valve, of maintaining constant pressure differential between pump and maximum load pressure are momentarily lost. With drop in load pressure below that, equivalent to high flow setting of variable leakage device 83, the valve control will assume its normal mode of operation. Since during simultaneous operation of two loads, the control system will maintain a constant pressure differential between the pump pressure and the pressure of the highest of the system loads, the flow control feature of the lower loads will be lost.

Although preferred embodiments of this invention have been shown and described in detail it is recognized that the invention is not limited to the precise forms and structure shown and various modifications and rearrangements as will readily occur to those skilled in the art upon full comprehension of this invention may be resorted to without departing from the scope of the invention as defined in the claims.

What is claimed is:

1. A valve assembly comprising a multiplicity of housings, each housing having an inlet chamber, a load chamber subjected to load pressure, an outlet chamber and exhaust means, valve bore means in each housing interconnecting said chambers and axially guiding a valve spool, load sensing port means at the region of each valve bore between said inlet chamber and said load chamber, check valve means operably connected with each of said load sensing port means to permit flow from said load sensing port means to a pressure chamber and to block reverse flow, bypass valve means interconnecting said inlet chambers and said exhaust means to maintain a constant pressure differential between said inlet chamber and said pressure chamber, said bypass valve means including a bypass spool, spring biasing means to bias said bypass spool in one direction to reduce said bypass flow, means responsive to pressure differential betwen pressure in said inlet chambers and pressure in said pressure chamber, said pressure in said pressure chamber being pressure of one of said load chambers subjected to highest load pressure, to bias said bypass spool in opposite direction to increase said bypass flow and pressure responsive variable leakage means continuously interconnecting said pressure chamber and said exhaust means to increase the response of said bypass valve means in a direction to increase said bypass flow, said pressure responsive variable leakage means having variable orifice means varied by pressure in said pressure chamber and subjected to pressure in said pressure chamber said variable leakage means includes spool means having guiding surface means guided in a bore interconnecting said pressure chamber and said exhaust means, varying flow area leakage passage means on said guiding surface means and connecting opposite ends of said spool means, spring biasing means biasing said spool means towards said pressure chamber and positioning said spool means in respect to said bore with change in pressure in said pressure chamber, said varying area leakage passage means cooperating with said interconnecting bore to produce a decrease in leakage flow in response to an increase in pressure in said pressure chamber.

2. A valve assembly as set forth in claim 1 wherein flow resistance means is interposed between said check valve means operably connected with each of said load sensing port means and said pressure chamber.

3. A valve assembly as set forth in claim 2 wherein said guiding surface of said spool has pressure relief flow area passage means connecting pressure fluid in said pressure chamber with surface of said bore in the region intermediate between said pressure chamber and said exhaust means to interconnect said pressure chamber and said exhaust means at a preselected maximum system pressure in said pressure chamber, said means responsive to pressure differential moving said bypass spool towards position of increased bypass flow to maintain said maximum system pressure at a relatively constant level.

4. A valve assembly as set forth in claim 3 wherein said variable flow area passage means and said pressure relief area passage means on said guiding surface means of said spool are radially spaced and sealed by said guiding surfâce means from each other.

5. A valve assembly comprising at least one housing having an inlet chamber, a load chamber, an outlet chamber and exhaust means, valve bore means in said housing interconnecting said chambers and axially guiding a valve spool, load sensing port means selectively communicable with said load chamber by said valve spool, bypass valve means interconnecting said inlet chamber and said exhaust means operable to bypass fluid between said inlet chamber and said exhaust means to maintain a constant pressure differential between said inlet chamber and said load sensing port means, said bypass valve means including a bypass spool, spring biasing means to bias said bypass spool in one direction to reduce said bypass flow, means responsive to pressure differential between said inlet chamber and said load sensing port means to bias said bypass pool in opposite direction to increase said bypass flow and a pressure responsive variable leakage means continuously interconnecting said load sensing pot means and said exhaust means to increase the response of said bypass valve means in direction to increase said bypass flow, said pressure responsive variable leakage means having variable orifice means varied by pressure in said pressure chamber and subjected to pressure in said pressure chamber, said variable leakage means includes spool means having guiding surface means guided in a bore interconnecting said pressure chamber and said exhaust means, varying flow area leakage passage means on said guiding surface means and connecting opposite ends of said spool means, spring biasing means biasing said spool means towards said pressure chamber and positioning said spool means in respect to said bore with change in pressure in said pressure chamber, said varying area leakage passage means cooperating with said interconnecting bore to produce a decrease in leakage flow in response to an increase in pressure in said pressure chamber.

* * * * *